(12) United States Patent
Phillips et al.

(10) Patent No.: US 7,997,398 B1
(45) Date of Patent: Aug. 16, 2011

(54) HYDRAULICALLY ACTUATED MARINE TRANSMISSION

(75) Inventors: George E. Phillips, Oshkosh, WI (US); Wayne M. Jaszewski, Jackson, WI (US)

(73) Assignee: Brunswick Corporation, Lake Forest, IL (US)

( * ) Notice: Subject to any disclaimer, the term of this patent is extended or adjusted under 35 U.S.C. 154(b) by 699 days.

(21) Appl. No.: 12/059,150

(22) Filed: Mar. 31, 2008

(51) Int. Cl.
*B63H 20/20* (2006.01)
*F16D 25/10* (2006.01)

(52) U.S. Cl. ............... 192/48.604; 192/48.612; 192/51; 192/85.5; 440/75

(58) Field of Classification Search ............... 192/85.38, 192/48.612, 48.618
See application file for complete search history.

(56) References Cited

U.S. PATENT DOCUMENTS

| | | |
|---|---|---|
| 3,623,583 A | 11/1971 | Shimanckas |
| 3,752,281 A | 8/1973 | Arnold |
| 3,919,964 A | 11/1975 | Hagen |
| 3,944,035 A | 3/1976 | McRay |
| 4,698,035 A | 10/1987 | Ferguson |
| RE36,342 E | 10/1999 | McFadyen |
| 6,062,926 A | 5/2000 | Alexander et al. |
| 6,755,703 B1 * | 6/2004 | Erickson ................. 440/75 |
| 6,884,131 B2 | 4/2005 | Katayama |
| 7,162,946 B2 | 1/2007 | Jeon |
| 7,291,048 B1 | 11/2007 | Phillips et al. |

OTHER PUBLICATIONS

U.S. Appl. No. 11/893,746, Phillips et al.

\* cited by examiner

*Primary Examiner* — Rodney Bonck
(74) *Attorney, Agent, or Firm* — William D. Lanyi (57) ABSTRACT

A marine transmission provides a cylindrical spool valve that is disposed within the gear case of the transmission and has a movable portion that is axially movable in a vertical direction to select forward, neutral, and reverse gear positions of the transmission. A piston assembly provides a primary piston and two auxiliary pistons which cooperate with each other to provide appropriate hydraulic forces which move a dog clutch into engagement with forward or reverse gears or toward a location in non-engagement with neither the forward nor reverse gears. The spool valve is generally cylindrical and disposed within a narrow column portion of the gear case of a marine propulsion system.

20 Claims, 7 Drawing Sheets

HYDRAULICALLY ACTUATED MARINE TRANSMISSION

BACKGROUND OF THE INVENTION

1. Field of the Invention

The present invention is generally related to a hydraulically actuated marine transmission and, more particularly, to a marine propulsion device which utilizes a solenoid and associated spool valve to direct the flow of hydraulic fluid to various portions of an actuating hydraulic cylinder, wherein the spool valve is located in the structure of a marine gear case.

2. Description of the Related Art

Those skilled in the art of marine propulsion systems and marine transmissions are aware of many different applications of hydraulic power to shift a marine transmission between forward, neutral, and reverse gear positions.

U.S. Pat. No. 3,623,583, which issued to Shimanckas on Nov. 30, 1971, describes an electrically operated control mechanism for a hydraulic shifting mechanism. A marine propulsion unit or drive includes a hydraulic mechanism which is operative to effect shifting of a clutch from a fail-safe forward drive condition to either a neutral or reverse condition. It also describes an electrically operated control mechanism for the hydraulic mechanism. The control mechanism is also designed to fail-safe in forward drive position. The control mechanism includes aligned, neutral and rearward drive solenoids which are selectively energizeable to afford neutral and reverse drive and which are operably associated with a single plunger carrying a spool valve embodied in the hydraulic system.

U.S. Pat. No. 3,752,281, which issued to Arnold on Aug. 14, 1973, describes reversing clutches with selector and pressure modulating valve. A power transmission including a forward, friction plate, modulating type friction clutch, a reverse modulating type clutch, and a selector control valve assembly. The assembly has a rotatable selector spool that acts to select the proper direction of the travel for the water craft or vehicle with which it is used.

U.S. Pat. No. 3,919,964, which issued to Hagen on Nov. 18, 1975, describes a marine propulsion reversing transmission with a hydraulic assist. The reversing transmission is located in a propulsion unit and connects a driveshaft to a propeller shaft. It is shiftable between neutral, forward drive, and rearward drive conditions.

U.S. Pat. No. 3,944,035, which issued to McRay on Mar. 16, 1976, describes a fluid control system for a hydraulically operated transmission and master clutch. The device is described in relation to a motor grader and comprises a normally engaged main engine clutch, a high-low power clutch range transmission, and a four speed reversible power shift main transmission. The main engine clutch is releasable manually by a clutch pedal or releasable automatically by a hydraulically operated clutch release cylinder.

U.S. Pat. No. 4,698,035, which issued to Ferguson on Oct. 6, 1987, describes a marine propulsion device hydraulic system. The device comprises a propulsion unit adapted to be pivotally mounted on the transom of a boat for pivotal movement relative to the transom about a steering axis. It includes a rotatably mounted propeller, an engine including a throttle lever, and a shiftable transmission drivingly connecting the engine to the propeller and including a shift lever.

U.S. Pat. No. Re. 36,342, which issued to McFadyen et al. on Oct. 19, 1999, describes a low deadband marine hydraulic steering system. A lock valve for marine hydraulic steering systems includes a valve body with a spool valve reciprocally received in a bore therein. A first port and a second port of the valve are connected to a manual pump. A third port and fourth port are connectable to a double acting hydraulic cylinder connected to a rudder or steerable motor. There are valves with the lock valve which normally prevent fluid flowing between the ports so the steering system remains in a fixed position when the helm is released. Fluid can flow from the first port to the third port when the first port is pressurized. A return flow of fluid from the fourth port to the second port is permitted only when the first nozzle is pressurized.

U.S. Pat. No. 6,062,926, which issued to Alexander et al. on May 16, 2000, discloses a hydraulic system for a dual propeller marine propulsion unit. A vertical driveshaft is operably connected to the engine of the propulsion unit and carries a pinion that drives a pair of coaxial bevel gears. An inner propeller shaft and an outer propeller shaft are mounted concentrically in the lower torpedo section of the gear case and each propeller shaft carries a propeller. To provide forward movement for the watercraft, a sliding clutch is moved in one direction to operably connect the first of the bevel gears with the inner propeller shaft to drive the rear propeller. A hydraulically operated multi-disc clutch is actuated when engine speed reaches a preselected elevated value to operably connect a second of the bevel gears to the outer propeller shaft, to thereby drive the second propeller in the opposite direction.

U.S. Pat. No. 6,884,131, which issued to Katayama et al. on Apr. 26, 2005, describes a shift mechanism for a marine propulsion unit. An outboard motor incorporates a driveshaft and a propulsion shaft driven by the driveshaft. The driveshaft carries a pinion. The propulsion shaft carries forward and reverse gears. The pinion always meshes with the forward and reverse gear and drives the forward and reverse gears in opposite directions relative to each other. A hydraulic forward clutch mechanism couples the forward gear with a propulsion shaft. A hydraulic reverse clutch mechanism couples the reverse gear with the propulsion shaft. A shift actuator selectively operates the forward clutch mechanism or the reverse clutch mechanism to provide forward, reverse and/or neutral running conditions for the outboard motor.

U.S. Pat. No. 7,162,946, which issued to Jeon on Jan. 16, 2007, describes a hydraulic control valve having a holding valve with improved response characteristics. The hydraulic control valve includes a valve housing including a pump path communicating with a hydraulic pump, a tank path communicating with an oil tank, and first and second cylinder ports communicating with a hydraulic cylinder, a control spool movably provided in the valve housing, cutting the pump to path off the first and second cylinder ports in a neutral state and selectively connecting the pump path and the tank path with the first and second cylinder ports while moving in left and right directions if pilot signal pressures are applied thereto. It also comprises a holding valve provided between the second cylinder port and the control spool, cutting out the second cylinder port when the control spool is in a neutral state and holding load of the hydraulic cylinder so as not to cause natural drop of the hydraulic cylinder. It also provides an actuating path for the holding valve connecting hydraulic oil of the second cylinder port to the tank path when the control spool is in a neutral state.

U.S. Pat. No. 7,291,048, which issued to Phillips et al. on Nov. 6, 2007, discloses an actuator device for a marine propulsion transmission. An actuator of a marine propulsion transmission is attached to a movable clutch member through the use of a coupler which comprises a generally spherical member formed as a portion of the actuator and a check device formed as part of the clutch member. The generally spherical member, or alternatively shaped component, is received by the check device and retained therein. The components are configured to allow relative rotation between the actuator and the clutch member while causing them to move axially in synchrony with each other.

U.S. patent application Ser. No. 11/893,746 (M10122), which was filed on Aug. 17, 2007 by Phillips et al., discloses an actuator for a marine transmission which uses four cavities of preselected size in order to provide four potential forces resulting from pressurized hydraulic fluid within those cavities. The effective areas of surfaces acted upon by the hydraulic pressure are selected in order to provide increased force to move the actuator toward a neutral position from either a forward or reverse gear position. Also, the relative magnitudes of these effective areas are also selected to provide a quicker movement into gear than out of gear, given a similar differential magnitude of pressures within the cavities.

The patents described above are hereby expressly incorporated by reference in the description of the present invention.

It would be significantly beneficial if a marine transmission could be provided with a spool valve contained within the gear case of the transmission and configured to conduct pressurized oil to and from a hydraulic piston system in a way which takes advantage of all of the capabilities of the hydraulically actuated transmission.

SUMMARY OF THE INVENTION

A marine transmission control system made in accordance with a preferred embodiment of the present invention comprises a pump, a gear case configured to support a propeller shaft for rotation about a generally horizontal axis, a clutch member which is axially movable between mechanical engagement with a forward gear and mechanical engagement with a reverse gear, a hydraulic cylinder configured to cause the clutch member to selectively move toward one of the forward and reverse gears, and a spool valve disposed within the gear case and connected in fluid communication between the pump and the hydraulic actuator.

In a particularly preferred embodiment of the present invention, the spool valve is a three position spool valve and is movable along a generally vertical axis within the gear case. The system can further comprise a solenoid connected to the spool valve. The solenoid is movable into forward, neutral and reverse positions. The hydraulic cylinder can comprise a cylinder portion and a piston portion wherein the piston portion comprises three parts which define four cavities within the cylinder portion. The spool valve can comprise a plurality of axial flutes formed within its structure. A first one of the axial flutes is configured to conduct hydraulic fluid from the pump to a first one of the four cavities. A second one of to the axial flutes is configured to conduct hydraulic fluid from the pump to a second one of the four cavities. A third axial flute conducts hydraulic fluid from the pump to a third one of the four cavities and a fourth one of the axial flutes conducts hydraulic fluid from the pump to a fourth one of the four cavities.

The spool valve, in a particularly preferred embodiment of the present invention, comprises a movable portion and a stationary portion. The stationary portion comprises an inner portion which is shaped to provide a plurality of fluid passages therein and which is disposed within an outer cylindrical tube. The pump is disposed within the gear case in a preferred embodiment of the present invention and connected in fluid communication with the spool valve.

BRIEF DESCRIPTION OF THE DRAWINGS

The present invention will be more fully and completely understood from a reading of the description of the preferred embodiment of the present invention in conjunction with the drawings, in which.

DESCRIPTION OF THE PREFERRED EMBODIMENT

Throughout the description of the preferred embodiment of the present invention, like components will be identified by like reference numerals.

Figure 1:
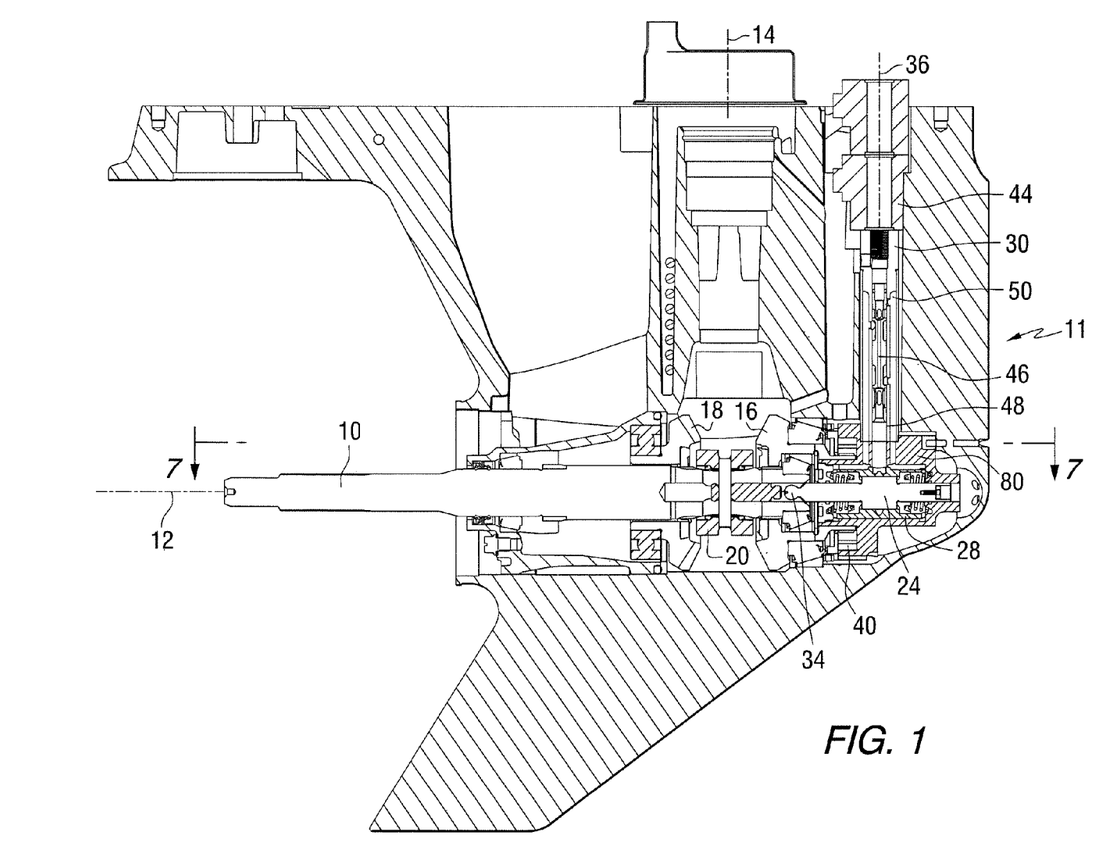
FIG. 1 is a section view of a gear case of a marine propulsion device.

FIG. 1 is a section view of a gear case of a marine propulsion device. A propeller shaft 10 is supported by the gear case for rotation about a generally horizontal axis 12. A generally vertical driveshaft (not shown in FIG. 1) is supported for rotation about axis 14 and drives a gear (not shown in FIG. 1) which is disposed in tooth meshing relation with both the forward gear 16 and reverse gear 18 which rotate in opposite directions about axis 12. A dog clutch 20 is axially movable into engagement with either the forward 16 or reverse 18 gears and always rotates in synchrony with the propeller shaft 10. The dog clutch 10 is moved in an axial direction by a piston that is connected to the dog clutch 20 in a manner which is described in detail in the patent application filed by Phillips et al. and identified above. That patent application illustrates the three-part piston structure which is disposed within the cylinder 28. Although the preferred embodiment of the present invention is particularly configured to control the movement of each of the parts of the three-part piston structure, it should be understood that alternative embodiments of the present invention can be adapted to control the movement of a single piston disposed within the cylinder. Actuation of the piston 24 within the cylinder 28 causes the dog clutch 20 to move into forward, neutral, or reverse gear positions.

With continued reference to FIG. 1, a spool valve 30 is used to direct hydraulic fluid into selected cavities within the hydraulic cylinder 28. Those cavities are defined by the main piston structure and two additional piston components as described in patent application Ser. No. 11/893,746 (Phillips et al.). In addition, the actuation system which is provided to move the dog clutch 20 axially along axis 12 is described in detail in U.S. Pat. No. 7,291,048. The particular configuration of the ball 34 and associated chuck is not restricting or limiting to the present invention. However, U.S. Pat. No. 7,291,048 is helpful in describing its operation and relationship to both the piston 24 and dog clutch 20. The spool valve 30 is axially movable along axis 36. This movement is in an upward and downward direction and controls the flow of hydraulic fluid between a pump 40 and selected cavities within the hydraulic cylinder 28 which are defined by the three segments of the piston structure. An electrical solenoid 44, of a type which is known to those skilled in the art, is configured to actuate the axial movement of a movable portion 46 of the spool valve relative to a stationary portion 48. The stationary portion 48 of the spool valve 30 comprises a plurality of axially disposed flutes and is located within a cylindrical tube 50. The spool valve 30 and the solenoid 44, in a preferred embodiment of the present invention, are disposed within the structure of the gear case 11.

Figure 2:
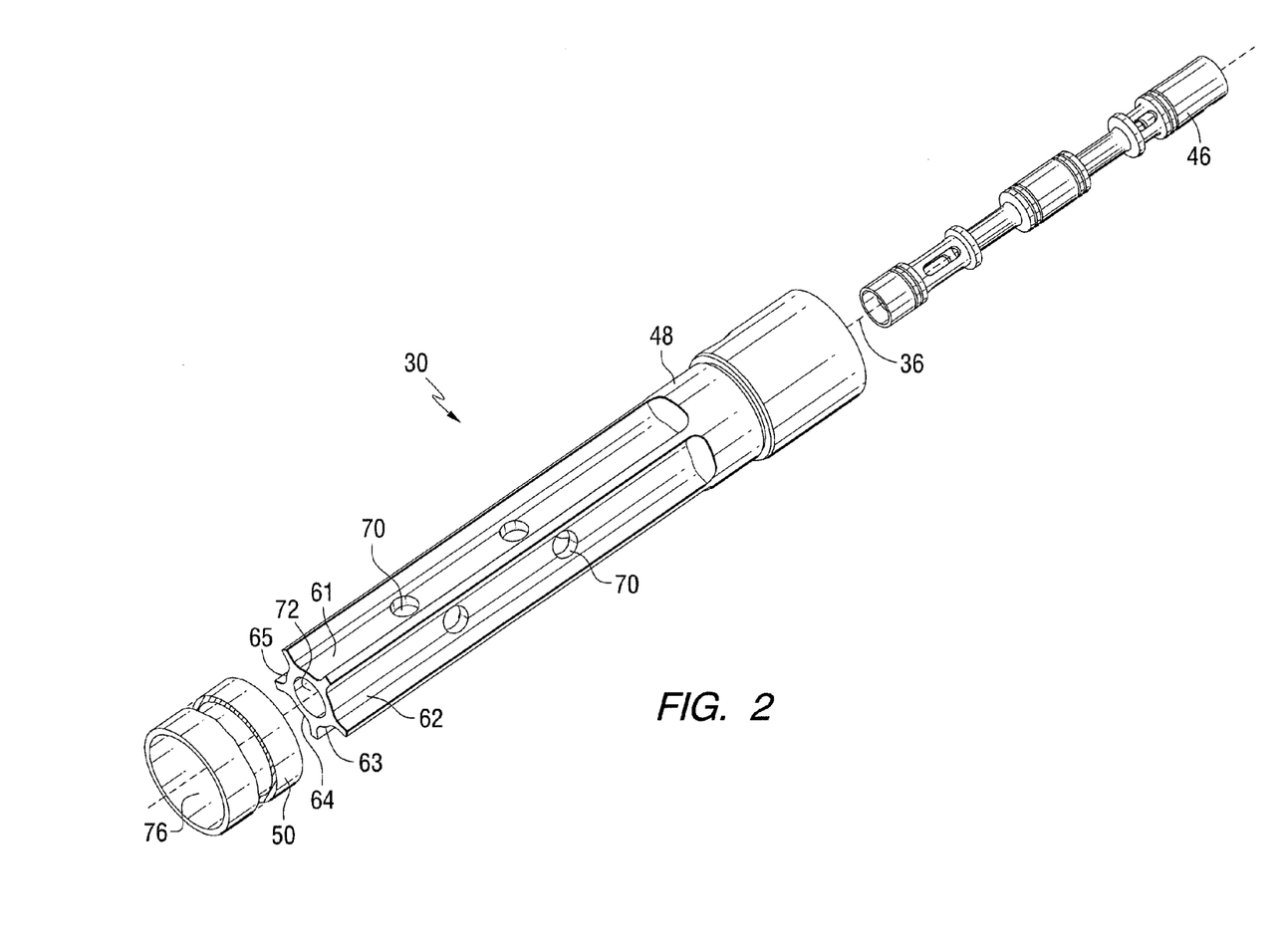
FIG. 2 is an exploded isometric view of the spool valve structure of the present invention.

FIG. 2 is an isometric exploded view of the spool valve 30. The stationary portion 48 comprises five axial flutes, 61-65, and a plurality of radial openings 70. The stationary portion 48 also has a central conduit 72 disposed in fluid communication with the radial openings 70. The stationary portion 48 is disposed within the internal cylindrical opening 76 of the outer cylindrical tube 50. The movable portion 46 of the spool valve is configured to connect the cylindrical opening 72 and axial flute 61 of the stationary portion 48 in fluid communication with selected ones of the plurality of radial openings 70 in a manner which will be described below. The movable portion 46 of the spool valve is axially movable, along axis 36, relative to the stationary portion 48. It should be understood that axial flute 61, in a particularly preferred embodiment of the present invention, is used to direct high pressure hydraulic fluid from the pump 40, as described above in conjunction with FIG. 1, to the other axial flutes, 62-65, based on the axial position of the movable portion 46 of the spool valve.

Figure 3:
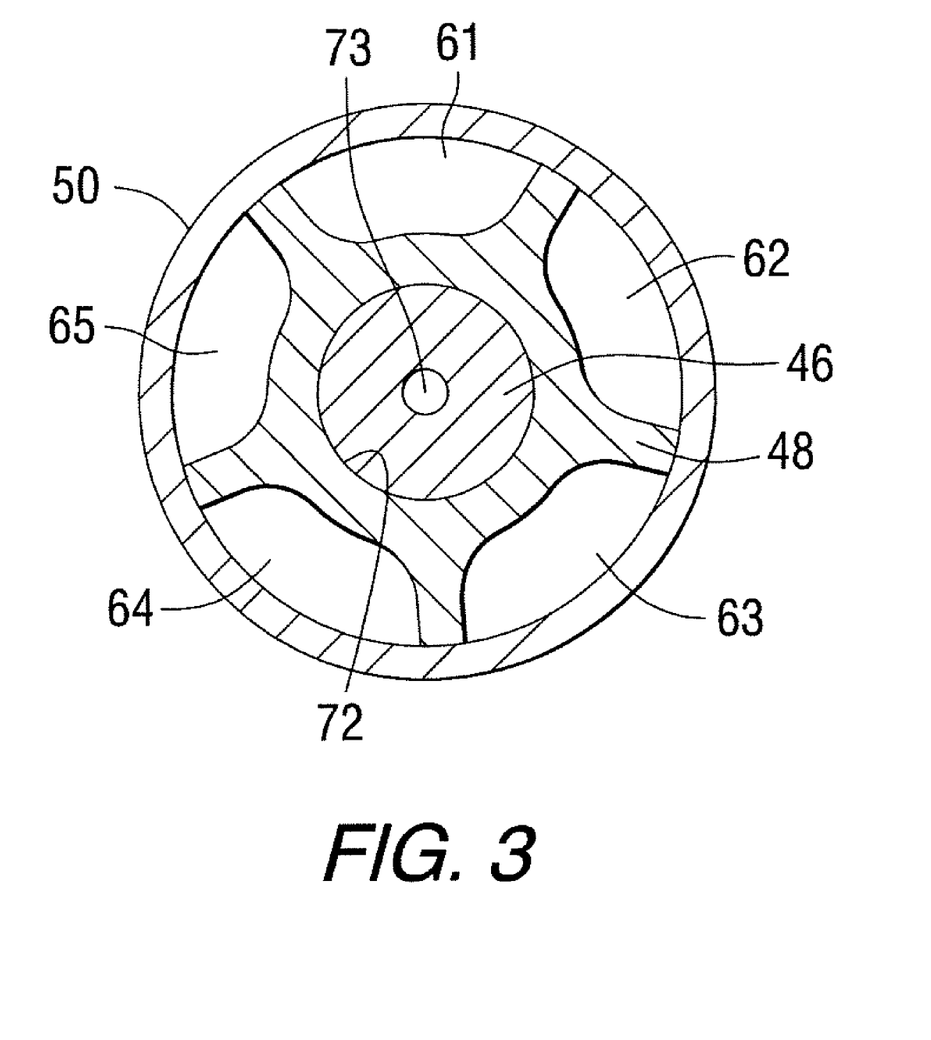
FIG. 3 is a section view of the spool valve of a preferred embodiment of the present invention.

FIG. 3 is a section view of the movable portion 46 of the spool valve disposed within the stationary portion 48. In FIG. 3, the five fluted channels, 61-65 and central opening 72, can be seen. These five fluted channels are axially disposed in the outer surface of the stationary portion 48 and define hydraulic fluid is paths in the manner which will be described in greater detail below. Opening 73 extends through the entire length of the movable portion 46 and connects the opposite portions of the cylindrical opening 72 in order to equalize pressure in those two portions. When return flow of hydraulic fluid is directed into the central conduit 73 of the movable portion 46, its direction of flow is determined by the relative pressures in these portions of the cylindrical opening 72. In either case, the hydraulic fluid flows back to the reservoir or holding tank to be recycled as needed.

Figure 4:
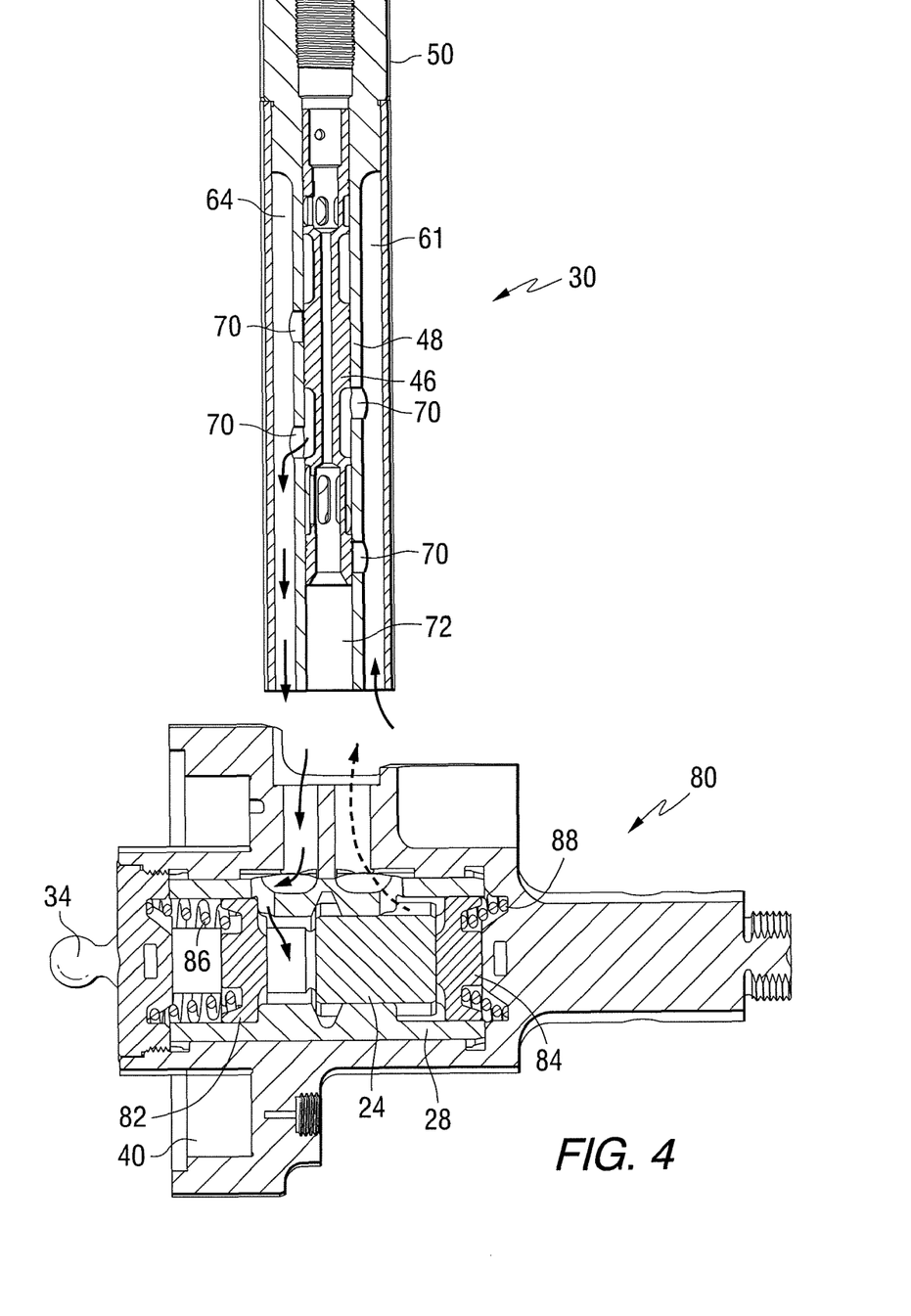
FIG. 4 shows the spool valve and hydraulic cylinder cartridge when the hydraulic cylinder cartridge is moved to a forward gear position.

FIG. 4 is a section view that shows the operational relationship between the spool valve 30 and the hydraulic cylinder cartridge 80 which contains the hydraulic cylinder 28, the primary piston 24 and two auxiliary pistons, 82 and 84. Two springs, 86 and 88, are provided to urge the auxiliary pistons, 82 and 84, toward each other and toward the primary piston 24. The operation of the primary piston 24 and auxiliary pistons, 82 and 84, are described in detail in U.S. patent application Ser. No. 11/893,746, which was filed by Phillips et al. on Aug. 17, 2007, as described above. The detailed operation of the primary and auxiliary pistons will not be described in detail herein.

With continued reference to FIG. 4, the position of the movable portion 46 of the spool valve 30 and the positions of the primary 24 and auxiliary, 82 and 84, pistons, represent their respective positions when the system is shifting to a forward gear position. As described in U.S. Pat. No. 7,291, 048, this shifting operation includes the movement of the ball 34 toward the right in FIG. 4. The position of the movable portion 46 of the spool valve, relative to the stationary portion 48, allows hydraulic fluid to flow upward through the flute 61, through one of the radial openings 70, as illustrated in FIG. 4, and downwardly through one of the axial flutes 64 and to the cavity between the primary piston 24 and auxiliary piston 82. This flow of hydraulic fluid is represented by the solid line arrows in FIG. 4. This flow of hydraulic fluid, upwardly through axial flute 61, radially through selected openings 70, and downwardly through axial flute 64, is under pressure and directed from the pump into axial flute 61 as shown in FIG. 4. The axial position of the movable portion 46 determines which of the radial openings 70 will direct the flow of this pressurized hydraulic fluid from axial flute 61 to axial flute 64. In FIG. 4, the return flow of hydraulic fluid from the hydraulic cylinder cartridge 80 is directed to selected axial flutes (neither flute 61 nor flute 64) and through a central axial conduit of the movable portion 46 so that the hydraulic fluid can be directed by to a reservoir through central port 72.

Figure 5:
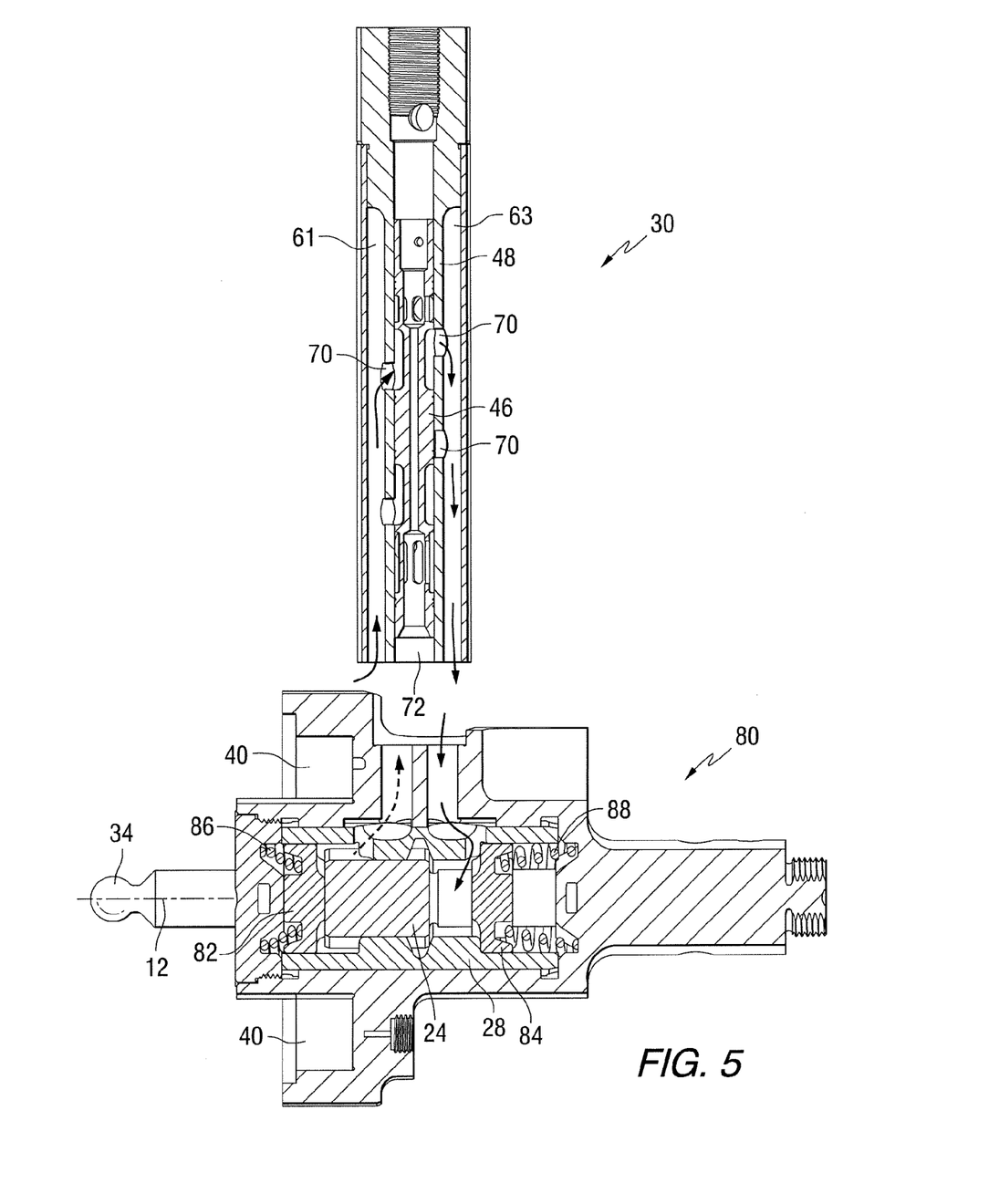
FIG. 5 is generally similar to FIG. 4 except that the hydraulic cylinder cartridge is moved to a reverse gear position.

FIG. 5 shows the positions of the movable portion 46 relative to the stationary portion 48 of the spool valve 30 and the positions of the primary piston 24 and auxiliary pistons, 82 and 84, when the transmission is being caused to move to a reverse gear position. In other words, the positions of the components in FIG. 5 illustrate their operational positions which cause the ball 34 to move toward the left in FIG. 5. With respect to FIG. 1, this movement causes the dog clutch 20 to move into engagement with the reverse gear 18 and cause the propeller shaft 10, with its associated propeller, to rotate in a reverse propulsive direction.

With continued reference to FIG. 5, the positions of the components illustrated in the section view of the spool valve 30 and the hydraulic cylinder cartridge 80 direct the flow of pressurized hydraulic fluid, as represented by solid line arrows, into the space between the primary piston 24 and auxiliary piston 84. This causes the primary piston 24 to move toward the left, in the manner described in the Phillips et al. application filed on Aug. 17, 2007. The position of the movable portion 46 of the spool valve 30 causes pressurized hydraulic fluid to flow upward through one of the axial flutes 61, through a selected one of the radial openings 70, as illustrated in FIG. 5, downwardly through one of the axial flutes 63, and into the space between the primary piston 24 and auxiliary piston 84. The flow of hydraulic fluid from the hydraulic cylinder cartridge 80 to the spool valve is represented by a dashed line arrow. It flows into a preselected one of the axial flutes (neither flute 61 nor 63) and is directed, by the axial position of the movable portion 46, to the central conduit 72. This return oil is then conducted to a reservoir to be recycled. It should be understood that many types of hydraulic pumps can be used in association with the present invention. However, a gerotor pump is intended for use in a particularly preferred embodiment of the present invention. The gerotor pump 40 can be disposed for rotation about the propeller shaft axis 12 and supported within a cavity formed in the hydraulic cylinder cartridge 80.

Figure 6:
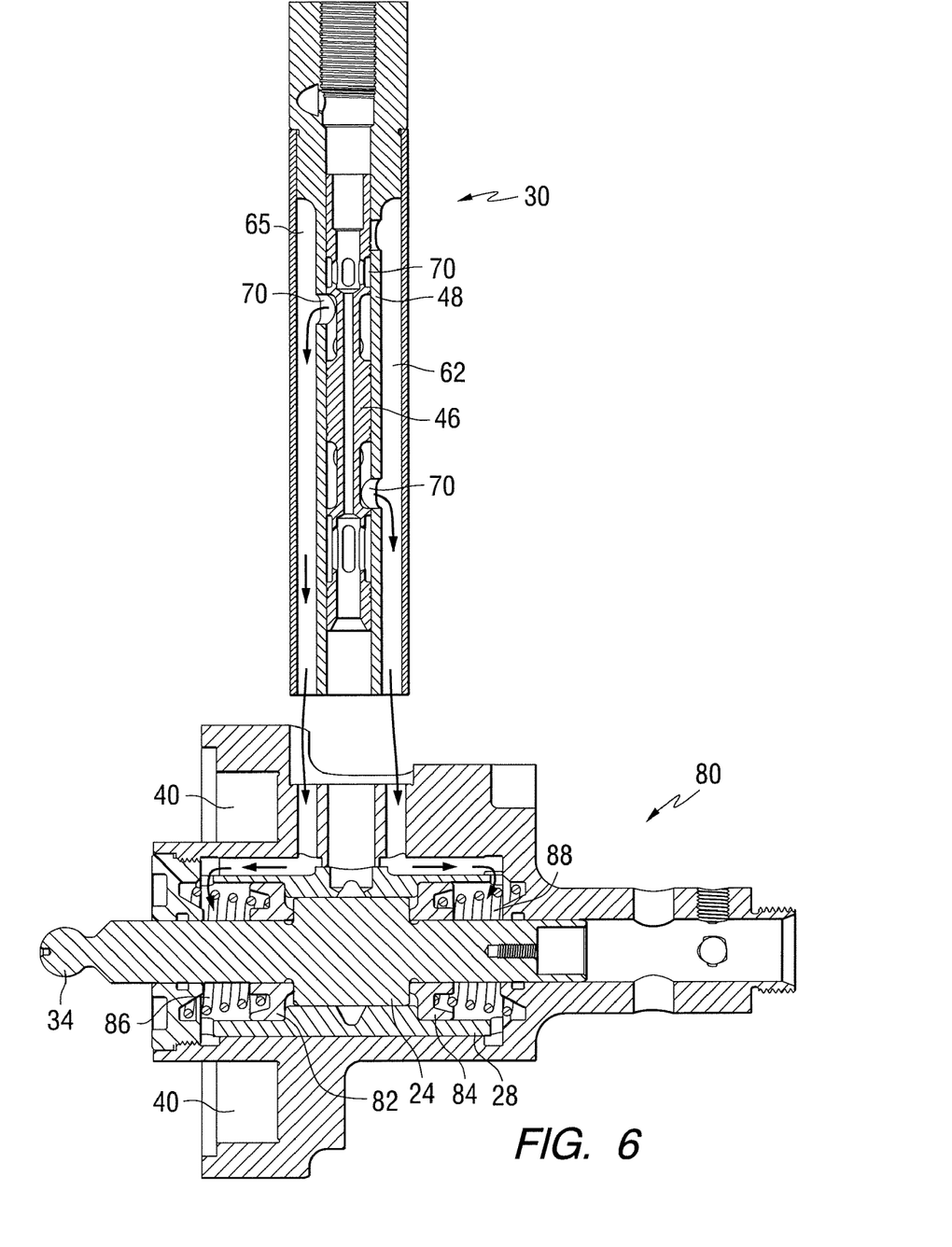
FIG. 6 is generally similar to FIGS. 4 and 5, but the piston of the hydraulic cylinder cartridge is moved to a neutral gear position.

FIG. 6 illustrates the position of the primary piston 24 and the position of the movable portion 46 of the spool valve 30 when the transmission is placed in a neutral gear position. It can be seen in FIG. 6 that the primary piston 24 is in a central position relative to the hydraulic cylinder 28 and the auxiliary pistons, 82 and 84, are also centrally positioned and in contact with the primary piston 24. The pressurized hydraulic fluid flows, in generally equal measure, to the cavities that are axially outside the auxiliary pistons, 82 and 84, as represented by the solid line arrows. In FIG. 6, high pressure hydraulic fluid is directed from the pump 40, as described above in conjunction with FIG. 1, into axial flute 61 (not visible in FIG. 6 because of the selected section view) and through selected radial openings 70 that are determined as a function of the axial position of the movable portion 46. In FIG. 6, it can be seen that this high pressure hydraulic fluid is then directed downwardly through axial flutes 62 and 65 to both sides of the piston assembly within the hydraulic cylinder cartridge 80. This urges the auxiliary pistons toward the primary piston 24 in cooperation with the springs, 86 and 88.

FIGS. 4-6 show how the primary piston 24 and auxiliary pistons, 82 and 84, are caused to move in selected directions along the propeller shaft axis 12 to move the dog clutch 20 into forward, reverse, and neutral directions, respectively. This movement is accomplished as a result of the vertical movement of the movable portion 46 relative to the stationary portion 48 of the spool valve 30. This vertical movement of the movable portion 46 ports the flow of pressurized hydraulic fluid through axial flute 61, through selected radial openings 70 and into selected axial flutes, 62-65. Hydraulic oil is returned to a holding tank as required, from the low pressure sides of the primary piston 24 and auxiliary pistons 82 and 84, upwards through selected axial flutes 62-65, through selected radial openings 70 and into the central opening 72 of the spool valve 30 and, more particularly, through the central opening that extends through the movable portion 46 of the spool valve.

Figure 7:
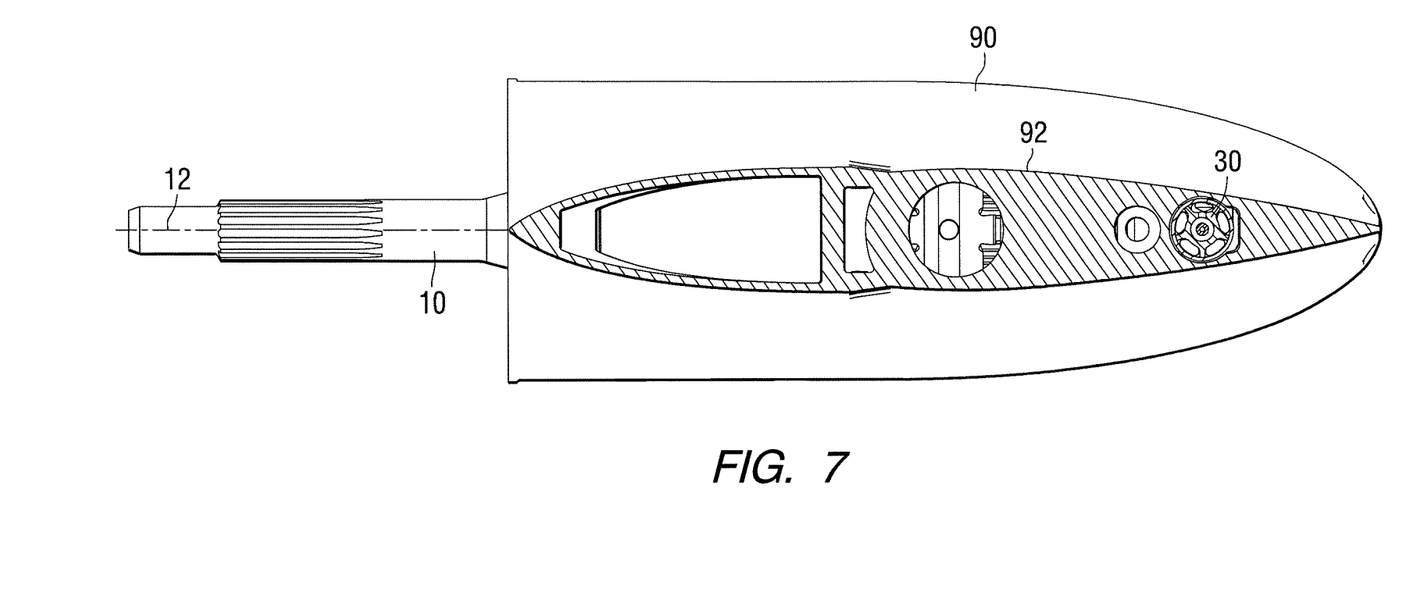
FIG. 7 is a section view of the gear case shown in FIG. 1.

FIG. 7 is a section view, looking in a downward direction, through the gear case shown in FIG. 1. More specifically, the section view in FIG. 7 is taken at a plane immediately above the hydraulic cylinder cartridge 80 in FIG. 1.

FIG. 7 clearly shows the important benefit that the present invention provides for the marine transmission illustrated in FIG. 1 and described in relation to FIGS. 2-6. The location of the spool valve 30 is severely limited in size because of the shape of the vertical column 92 of the gear case above the torpedo section 90 that contains the dog clutch 20, the forward and reverse gears, 16 and 18, and the propeller shaft 10. The vertical column 92 is narrow and severely tapered in order to provide the advantageous hydrodynamic characteristics that are necessary in marine propulsion devices of this type. By using a very narrow and severely tapered vertical column 92, hydrodynamic drag is minimized. However, by using a very narrow column structure, with a significant taper, as shown in FIG. 7, the available space for the valve structure is severely limited. As a result, the embodiments of the present invention, described above, are significantly beneficial and permit a hydraulically actuated transmission to be incorporated within the limited space provided within the vertical column 92. In order to perform the functions of causing the transmission to shift between forward, neutral, and reverse gear positions, while being confined in the extremely narrow portion of the vertical column 92, significant modifications were required in the structure of the actuating spool valve 30. First, the total diameter of the spool valve 30 had to be severely limited in order to be contained within the vertical column 92 of the gear case 11. This is accomplished, in a preferred embodiment of the present invention, by using a spool valve with a movable portion 46 that is axially movable along a vertical axis.

With continued reference to FIGS. 1-7, the use of axial flutes, 61-65 and central opening 72, in combination with this vertical movement of the movable portion 46, allows the spool valve 30 to be located at the forward portion of the column 92 of the gear case 11. The vertical movement of the movable portion 46 also allows the full actuation of the transmission to be controlled in the severely confined space at the forward portion of the column 92 as illustrated in FIG. 7. The provision of five axial flutes, 61-65 and central opening 72, permits the spool valve 30 to control the movement of both the primary piston 24 and the auxiliary pistons, 82 and 84. This control allows the three-piece piston to operate in the manner for which it was designed, as described in the Phillips et al. application filed on Aug. 17, 2007.

With continued reference to FIGS. 1-7, it can be seen that the marine transmission control system, in a preferred embodiment of the present invention, comprises a pump 40, a gear case 11 configured to support a propeller shaft 10 for rotation about a generally horizontal axis 12, a clutch member 20 that is axially movable between mechanical engagement with a forward gear 16 and mechanical engagement with a reverse gear 18, a hydraulic actuator 80 configured to cause the clutch member 20 to selectively move toward one of the forward and reverse gears, 16 and 18, and a spool valve 30 disposed within the gear case 11 and connected in fluid communication between the pump 40 and the hydraulic actuator 80. The spool valve 30 is movable along a generally vertical axis 36 within the gear case 11 and the hydraulic actuator 80 comprises a cylinder portion 28 and a piston portion. The piston portion comprises three parts, 24, 82, and 84, which define four cavities within the cylinder portion 28. The spool valve 30 comprises a plurality of axial flutes, 61-65, formed within its structure. A first one of the axial flutes 61 is configured to conduct pressurized hydraulic fluid from the pump 40 to the second, third, fourth and fifth axial flutes 62-65 and, eventually, to the specific cavities of the hydraulic actuator. As required, the low pressure side of the primary piston 24 and/or auxiliary pistons 82 and 84 are vented to the holding tank, or reservoir, through the second, third, fourth and fifth axial flutes 62-65 that are configured to conduct return fluid through the central opening 72 to the holding tank. The spool valve 30 comprises a movable portion 46 and a stationary portion 48. The stationary portion comprises an inner portion which is shaped to provide the plurality of fluid passages therein and is disposed within an outer cylindrical tube 50. As described above, in a preferred embodiment of the present invention, the spool valve 30 is a three-position spool valve. A solenoid 44 is connected to the spool valve 30 and is movable into forward, neutral, and reverse positions. The pump 40 is disposed within the gear case 11 and connected in fluid communication with the spool valve 30.

Although the present invention has been described in particular detail and illustrated to show a preferred embodiment, it should be understood that alternative embodiments are also within its scope.

We claim:

1. A marine transmission control system, comprising:
   a pump;
   a gear case configured to support a propeller shaft for rotation about a generally horizontal axis;
   a clutch member which is axially movable between mechanical engagement with a forward gear and mechanical engagement with a reverse gear;
   a hydraulic actuator configured to cause said clutch member to selectively move toward one of said forward and reverse gears; and
   a spool valve disposed within said gear case and connected in fluid communication between said pump and said hydraulic actuator, wherein said spool valve comprises a plurality of axial flutes formed within its structure.

2. The system of claim 1, wherein:
   said spool valve is a three position spool valve.

3. The system of claim 2, wherein said hydraulic actuator comprises a cylinder portion and a piston portion, said piston portion comprising three parts which define four cavities within said cylinder portion.

4. The system of claim 2, wherein:
   said spool valve is movable along a generally vertical axis within said gear case.

5. The system of claim 4, further comprising:
a solenoid connected to said spool valve, said solenoid being movable into forward, neutral and reverse positions.

6. The system of claim 4, wherein:
said spool valve comprises a movable portion and a stationary portion.

7. The system of claim 6, wherein:
said stationary portion comprises an inner portion which is shaped to provide a plurality of fluid passages therein and which is disposed within an outer cylindrical tube.

8. The system of claim 1, wherein:
a first one of said axial flutes being configured to conduct hydraulic fluid from said pump to a first one of said four cavities, a second one of said axial flutes being configured to conduct hydraulic fluid from said pump to a second one of said four cavities, a third one of said axial flutes being configured to conduct hydraulic fluid from said pump to a third one of said four cavities, a fourth one of said axial flutes being configured to conduct hydraulic fluid from said pump to a fourth one of said four cavities.

9. The system of claim 1, wherein:
said pump is disposed within said gear case and connected in fluid communication with said spool valve.

10. A marine transmission control system, comprising:
a pump;
a gear case configured to support a propeller shaft for rotation about a generally horizontal axis;
a clutch member which is axially movable between mechanical engagement with a forward gear and mechanical engagement with a reverse gear;
a hydraulic actuator configured to cause said clutch member to selectively move toward one of said forward and reverse gears;
a spool valve disposed within said gear case and connected in fluid communication between said pump and said hydraulic actuator, said spool valve being a three position spool valve and said spool valve comprising a plurality of axial flutes formed within its structure; and
a solenoid connected to said spool valve, said solenoid being movable into forward, neutral and reverse positions.

11. The system of claim 10, wherein:
said spool valve is movable along a generally vertical axis within said gear case.

12. The system of claim 11, wherein said hydraulic actuator comprises a cylinder portion and a piston portion, said piston portion comprising three parts which define four cavities within said cylinder portion.

13. The system of claim 10, wherein:
a first one of said axial flutes being configured to conduct hydraulic fluid from said pump to a first one of said four cavities, a second one of said axial flutes being configured to conduct hydraulic fluid from said pump to a second one of said four cavities, a third one of said axial flutes being configured to conduct hydraulic fluid from said pump to a third one of said four cavities, a fourth one of said axial flutes being configured to conduct hydraulic fluid from said pump to a fourth one of said four cavities.

14. The system of claim 13, wherein:
said spool valve comprises a movable portion and a stationary portion.

15. The system of claim 14, wherein:
said stationary portion comprises an inner portion which is shaped to provide a plurality of fluid passages therein and which is disposed within an outer cylindrical tube.

16. The system of claim 15, wherein:
said pump is disposed within said gear case and connected in fluid communication with said spool valve.

17. A marine transmission control system, comprising:
a pump;
a gear case configured to support a propeller shaft for rotation about a generally horizontal axis;
a clutch member which is axially movable between mechanical engagement with a forward gear and mechanical engagement with a reverse gear;
a hydraulic actuator configured to cause said clutch member to selectively move toward one of said forward and reverse gears; and
a spool valve disposed within said gear case and connected in fluid communication between said pump and said hydraulic actuator, said spool valve being movable along a generally vertical axis within said gear case, said hydraulic actuator comprising a cylinder portion and a piston portion, said piston portion comprising three parts which define four cavities within said cylinder portion, said spool valve comprising a plurality of axial flutes formed within its structure, a first one of said axial flutes being configured to conduct hydraulic fluid from said pump to a first one of said four cavities, a second one of said axial flutes being configured to conduct hydraulic fluid from said pump to a second one of said four cavities, a third one of said axial flutes being configured to conduct hydraulic fluid from said pump to a third one of said four cavities, a fourth one of said axial flutes being configured to conduct hydraulic fluid from said pump to a fourth one of said four cavities, said spool valve comprising a movable portion and a stationary portion, said stationary portion comprising an inner portion which is shaped to provide a plurality of fluid passages therein and which is disposed within an outer cylindrical tube.

18. The system of claim 17, wherein:
said spool valve is a three position spool valve.

19. The system of claim 18, further comprising:
a solenoid connected to said spool valve, said solenoid being movable into forward, neutral and reverse positions.

20. The system of claim 19, wherein:
said pump is disposed within said gear case and connected in fluid communication with said spool valve.

* * * * *